MAGNETIC DATA STORAGE DEVICE UTILIZING DISCS WITH PREDETERMINED FREQUENCY ZONES
Original Filed Nov. 13, 1958

INVENTORS
FORREST A. JOHNSON &
BY HERBERT E. MILLER
Bower & Patalidis
ATTORNEYS

INVENTORS
FORREST A. JOHNSON &
BY HERBERT E. MILLER
Bower & Patalidis
ATTORNEYS 3,187,316
Patented June 1, 1965

3,187,316

MAGNETIC DATA STORAGE DEVICE UTILIZING DISCS WITH PREDETERMINED FREQUENCY ZONES

Forrest A. Johnson, Springfield, Vt., and Herbert E. Miller, Brookline, Mass., assignors to Ex-Cell-O Corporation, Detroit, Mich.

Original application Nov. 13, 1958, Ser. No. 773,586, now Patent No. 3,056,962, dated Oct. 2, 1962. Divided and this application July 31, 1961, Ser. No. 128,190
4 Claims. (Cl. 340—174.1)

This invention relates to magnetic data storage devices, and more particularly to an apparatus for the storage of information in the form of magnetic pulses recorded in a substantially thin magnetizable layer on the surface of a plurality of circular discs. This invention is a division of parent application, Serial No. 773,586, filed November 13, 1958, and which has now matured as Patent No. 3,056,962, issued October 2, 1962.

The invention has special application to magnetic data storage systems contemplating the storing of a large quantity of information under the smallest possible volume, while still allowing an access time to any particular piece of information which is reasonably short. Fast retrieving of information is advantageous in order not to unduly slow down the rapid processing of data which is characteristic of large modern electronic digital computers, data handling equipments and the like.

Magnetic storage systems of the magnetic core type provide very fast access to the stored information. Unfortunately the amount of storable data is somewhat limited unless a very large number of magnetic cores is used. Furthermore, the stored information is destroyed by the read-out process unless the information is immediately rewritten back into the magnetic core matrix. Magnetic storage systems of the magnetic tape type, on the other extreme, provide very slow access to the stored information, but permit the permanent storage of a large quantity of data under a relatively small volume. Magnetic storage systems of the magnetic drum type offer a compromise resulting in a permanent, although easily erasable, record of information under a relatively large volume, with a somewhat large capacity and slow access time.

Magnetic data storage systems of the disc type are a happy compromise resulting in a rather large capacity of permanent, but replaceable, information coupled with a relatively fast retrieving of the data, under a volume much smaller than a magnetic drum of equivalent capacity. One principal object of the invention, therefore, is to provide a high capacity magnetic disc data storage device.

A further object of the invention is to provide a magnetic disc data storage device endowed with a relatively short access time of the stored information.

An additional object of the invention is to provide a magnetic disc data storage device which is compact, rigid and sturdy.

A further object of the invention is to provide a magnetic disc data storage device which employs a building block principle of standard simple elements and which has a storage capacity commensurate to the number of standard modules or elements used in the final assembled apparatus.

Other objects and advantages will become apparent upon reading of the following description in conjunction with the accompanying drawings, illustrating the principles of the invention.

Figure 1:
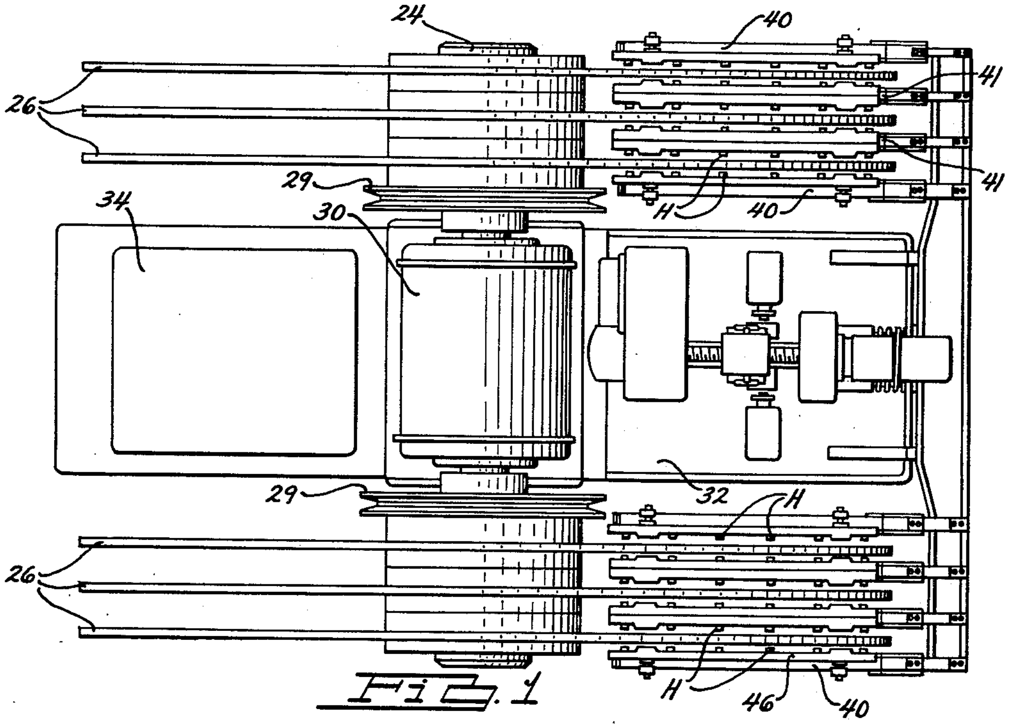
FIG. 1 is a top plan view of the magnetic storage device of this invention.
Figure 2:
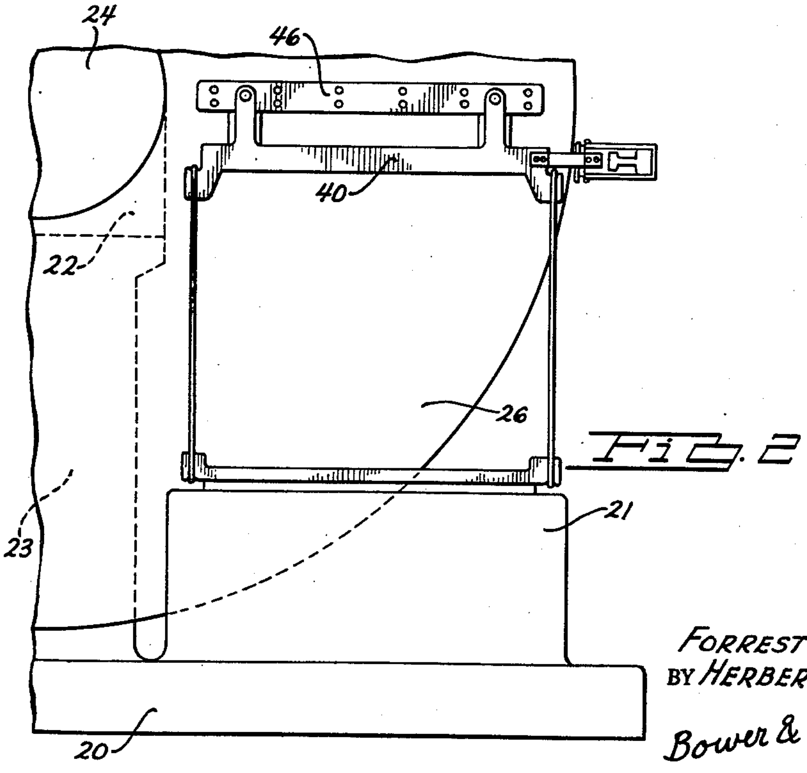
FIG. 2 is an end view of the device shown in FIG. 1.
Figures 3, 4:
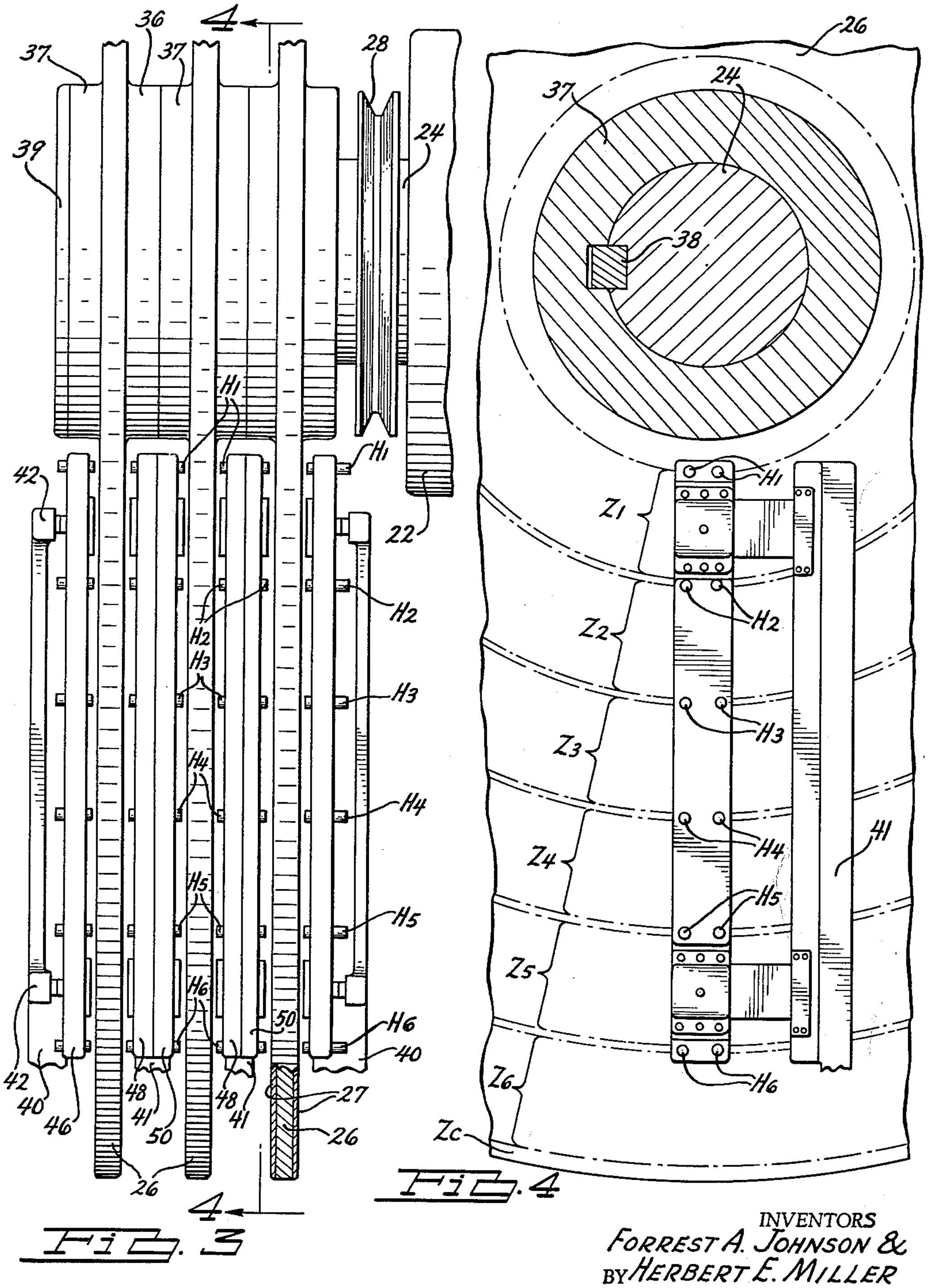
FIG. 3 is an enlarged plan view of a portion of the magnetic data storage device shown in FIG. 2.
FIG. 4 is a sectional view taken along line 4—4 of FIG. 3.

Referring to the drawing, and more particularly to FIGS. 1, 2 and 3, there is shown a rotatable disc magnetic data storage device which is supported by a bed 20. Extending upwardly from the bed 20 are a plurality of support ribs 21 and a pedestal 23 supporting a bearing housing 22. Suitably journaled within the bearing housing 22 is a rotatable shaft or spindle 24 which carries a plurality of discs 26 rigidly secured thereto by keys or the like. Each disc 26 has a magnetizable surface layer 27, FIG. 3, on each side thereof for receiving the magnetic data to be stored thereon. The shaft or spindle 24 and the discs 26 carried thereby are driven by means of V-belts, not shown, which are trained around driven pulleys 28 on shaft 24, and drive pulleys 29 which are rigidly connected to the shaft of a drive motor 30 which in turn is mounted on top of the bearing housing 22.

Also supported by the bed 20 are a positioner mechanism assembly 32 and a cabinet 34 for the controls of the device. Since these elements form no integral part of the present invention they will not be described in detail herein. The positioner mechanism assembly 32 is described in detail in our copending application Serial No. 773,585, filed November 13, 1958, and which has now matured as Patent No. 3,009,759.

A plurality of magnetic transducer heads H1, H2, H3, H4, H5 and H6 are provided adjacent each magnetizable surface layer 27 of each rotary disc 26, FIGS. 3 and 4. These transducer heads are equally spaced radially from the center of the disc 26 and are movable together relatively to the bed 20 in a radial direction to cover a limited distance or zone indicated in FIG. 4 by symbols Z1, Z2, Z4, Z5 and Z6. This radial movement may be continuous or in discrete steps actuated by an apparatus such as a positioner mechanism assembly 32 which forms no part of the present invention. Other arrangements for positioning the transducer heads relatively to the magnetizable surface layers may be used, e.g., where an arcuate sweeping movement of the heads is utilized.

In general, the structure shown in FIGS. 3 and 4 includes outboard transducer head carriers 46 for the outwardly facing disc surfaces and inboard head carriers 48–50 supporting the transducer heads in the space between adjacent discs. The inboard carriers 48–50 include a plurality of magnetic transducer heads H1, H2 . . . H6 in opposite directions, while the outboard carriers 46 also contain transducer heads H1, H2 . . . H6 facing inwardly only. The outboard carriers 46 are hinged to a frame 40 and the inboard carriers 48–50 are hingedly supported by a common inboard frame 41.

The magnetic transducer head carrier assembly forms no part of the present invention and is described in detail in Patent No. 3,056,962.

Each disc 26 has two flanges 36–37 fastened to the disc on both its faces at its center, or integral with the material of the disc. The flanges increase the thickness of the disc at its hub where it is mounted upon the shaft or spindle 24 by means of the key 38 or the like, to provide a more rigid fastening of the disc to the spindle and to act as a means for maintaining the plurality of discs evenly spaced along the length of the spindle.

An end cap 39 is fastened by means of screws and the like (not shown) to the end of the spindle 24 to hold the plurality of discs securely in position on the spindle.

Any number of similar discs 26 can be mounted on a spindle according to the capacity requirement of the magnetic data storage apparatus. It has been found that it is quite practical to thus mount up to fourteen discs on each half of the spindle 24 outboard of the pedestal, leading to a total number of discs as large as twenty-eight. It is however obvious that even a larger number of discs could thus be mounted in order to provide a larger storage capacity system, or several units of similar or different capacity can be combined together to supply any capacity that may be desirable.

As indicated previously, each disc face may be preferably divided in up to six recording zones Z1, Z2 . . . Z6, each zone having the same recording frequency and the same capacity of preferably up to 128 tracks. The reason for a multiple zone arrangement is to take advantage of the increase in length of the concentric tracks from the center to the periphery of the disc. This increase in length permits the recording of more "bits" of information in the tracks close to the edge of the disc than possible in the tracks close the center of the disc.

A six recording zone arrangement, determining six different recording frequencies as indicated above, requires six clock tracks for timing of the "bits" of information for recording and playback. A seventh zone Zc is reserved for the clock tracks and the clock tracks are read by heads (not shown) secured preferably in fixed mountings.

The selection of the desired track for recording or playback is effected in the following manner: Assuming arbitrarily, for the sake of explanation, that it is desired to address (select) track No. 112 of the fifth zone Z5, a signal will be fed to the input of the positioner mechanism 32. In response to that signal, the positioner will move all the heads "en bloc" to position No. 112. In other words, all the transducer heads will be registered with the track 112 of their respective zones. The final selection of transducer head H5 will be effected by switching, electronically for example. Head H5 will be switched on, and heads H1, H2, H3, H4 and H6 will be switched off. At the same time, the clock head corresponding to the fifth zone will be switched on to read the proper corresponding timing pulses.

It is obvious that any number of recording zones less than six can be used at the cost of reduced capacity. For example, it is quite conceivable to record at the same frequency on all the tracks, resulting in only one clock track being situated in the clock zone Zc.

While for the purpose of illustrating and describing the principles of the present invention certain preferred embodiments have been shown and described, it is obvious that various modifications of the invention other than those described may be effected by persons skilled in the art without departing from the principles and scope of the invention as defined in the appended claims.

We claim:

1. In a magnetic data storage apparatus comprising at least one disc-shaped record member having a magnetizable record surface on at least one side thereof, the combination of: $n$ concentric tracks on said record surface disposed in $m$ imaginary concentric zones whereby each zone contains $n/m$ concentric contiguous tracks; a predetermined recording and playback frequency assigned to each one of said zones and the frequencies of said zones increasing from the center to the periphery of said record surface; $m$ timing tracks, each one of said timing tracks having recorded thereon a timing signal of a frequency corresponding to the particular frequency assigned to one of said zones; and transducing means for recording information on the tracks of each one of said zones and for playing back said information, such recording and playback being effected in synchronism with the timing signal of the appropriate timing track corresponding to each one of said zones.

2. The magnetic data storage apparatus of claim 1 further comprising: $m$ data transducer heads, each one of said transducer heads being assigned to service each one of said zones; and positioning means for causing each one of said transducer heads to be positioned so as to register with any one of the tracks within the zone serviced by said transducer head.

3. In a magnetic data storage apparatus comprising at least one disc having a magnetizable surface layer on at least one side thereof, the combination of: a plurality of concentric track zones on said magnetizable surface layer; a plurality of concentric data tracks in each of said zones; a recording and playback frequency assigned to each of said zones, the several assigned frequencies increasing from the center zone to the peripheral zone; at least one recording and playback transducer head for each zone servicing solely all the tracks in said zone for recording and playback of data information on said tracks; and means for timing the recording and playback of data information on any one of said tracks according to the assigned frequency of the zone of said signal, said means comprising a timing track for each said zone providing timing pulses of the frequency assigned to said zone.

4. A magnetic data storage apparatus comprising: a support pedestal; a rotatable shaft extending horizontally on at least one side of said support pedestal; bearing means in said support for rotatably supporting said shaft; means rotatably driving said shaft; a plurality of spaced disc record members rigidly secured to said shaft for rotation thereby; a magnetizable record surface on both sides of each of said disc record members; a plurality of concentric tracks on each record surface for recording data information thereon and for reading data information therefrom, several contiguous such tracks being grouped in a zone and all the tracks in a given zone being capable of recording data information at a predetermined frequency which is the same for all the tracks of said zone and which is the same as the frequency of the corresponding zone of any other record surface, the frequencies of such zones increasing from the center to the periphery of the record surface; at least one data transducer head per zone indexable to any one track in such zone for recording data information on said track and for reading data information therefrom; and means for timing the recording and reading of said data information so that the data information recorded on all the tracks of a given zone is recorded at the zone frequency and read at the zone frequency.

References Cited by the Examiner

UNITED STATES PATENTS

| | | | |
|---|---|---|---|
| 2,800,642 | 7/57 | May | 340—174.1 |
| 2,811,709 | 10/57 | Haselton et al. | 340—174.1 |
| 2,994,856 | 8/61 | Dickinson | 340—174.1 |
| 3,007,144 | 10/61 | Hagopian | 340—174.1 |
| 3,025,710 | 3/62 | Muffley | 340—174.1 |

IRVING L. SRAGOW, *Primary Examiner.*

UNITED STATES PATENT OFFICE

CERTIFICATE OF CORRECTION

Patent No. 3,187,316 June 1, 196

Forrest A. Johnson et al.

It is hereby certified that error appears in the above numbered patent requiring correction and that the said Letters Patent should read as corrected below.

Column 4, line 26, for "signal" read -- track --; line 27, for "track" read -- signal --.

Signed and sealed this 22nd day of February 1966.

(SEAL)

Attest:

ERNEST W. SWIDER

Attesting Officer

EDWARD J. BRENNER

Commissioner of Patents